US012497535B2

(12) United States Patent
Suzuki et al.

(10) Patent No.: US 12,497,535 B2
(45) Date of Patent: Dec. 16, 2025

(54) POROUS LAYER CONSTITUENT AND PRODUCTION METHOD THEREFOR

(71) Applicant: DAINICHISEIKA COLOR & CHEMICALS MFG CO., LTD., Chuo-ku (JP)

(72) Inventors: Yusuke Suzuki, Toda (JP); Tatsuzo Murakawa, Itabashi-ku (JP); Kazuya Sasaki, Abiko (JP)

(73) Assignee: DAINICHISEIKA COLOR & CHEMICALS MFG CO., LTD., Chuo-ku (JP)

( * ) Notice: Subject to any disclaimer, the term of this patent is extended or adjusted under 35 U.S.C. 154(b) by 959 days.

(21) Appl. No.: 17/291,299

(22) PCT Filed: Nov. 7, 2019

(86) PCT No.: PCT/JP2019/043605
§ 371 (c)(1),
(2) Date: May 5, 2021

(87) PCT Pub. No.: WO2020/095978
PCT Pub. Date: May 14, 2020

(65) Prior Publication Data
US 2022/0002583 A1 Jan. 6, 2022

(30) Foreign Application Priority Data
Nov. 9, 2018 (JP) .................. 2018-211337

(51) Int. Cl.
*C08G 18/12* (2006.01)
*C08G 18/32* (2006.01)
(Continued)

(52) U.S. Cl.
CPC .......... *C09D 175/08* (2013.01); *C08G 18/12* (2013.01); *C08G 18/3231* (2013.01);
(Continued)

(58) Field of Classification Search
CPC ............ C08G 2150/60; C08G 18/4833; B32B 2266/0278; B32B 2307/72; C08J 2375/04; D06N 3/14
See application file for complete search history.

(56) References Cited

U.S. PATENT DOCUMENTS

| 6,794,446 B1 | 9/2004 | Takeda et al. |
| 2010/0216905 A1 | 8/2010 | Kuwamura et al. |

(Continued)

FOREIGN PATENT DOCUMENTS

| CN | 105463867 A | * 4/2016 | ............ D06C 23/04 |
| JP | 60-255423 A | 12/1985 | |

(Continued)

OTHER PUBLICATIONS

CN105463867A (Year: 2016).*
(Continued)

*Primary Examiner* — Catherine S Branch
*Assistant Examiner* — Huihong Qiao
(74) *Attorney, Agent, or Firm* — Oblon, McClelland, Maier & Neustadt, L.L.P.

(57) ABSTRACT

The present invention relates to a porous layer structure containing a base material and a polyurethane porous layer formed on the base material, wherein a moisture permeability A of the porous layer structure measured by JIS L1099 A-1 (calcium chloride method) is 2000 to 10000 g/(m²·24 h), a moisture permeability loss rate obtained by a predetermined formula from a moisture permeability B of the base material alone measured by JIS L1099 A-1 (calcium chloride method) and the moisture permeability A is 75% or less, and a peel strength at a bonding surface between the base material and the polyurethane porous layer is 0.7 kgf/inch or more.

11 Claims, 1 Drawing Sheet

(51) Int. Cl.
  *C08G 18/48* (2006.01)
  *C09D 175/08* (2006.01)
  *C08G 101/00* (2006.01)

(52) U.S. Cl.
  CPC ..... *C08G 18/4833* (2013.01); *C08G 2101/00* (2013.01); *C08G 2110/005* (2021.01); *C08G 2150/60* (2013.01)

(56) References Cited

U.S. PATENT DOCUMENTS

| | | |
|---|---|---|
| 2010/0258762 A1 | 10/2010 | Isobe et al. |
| 2013/0183491 A1 | 7/2013 | Fujisawa et al. |
| 2013/0224467 A1* | 8/2013 | Hirao .................... C08G 18/28 428/221 |
| 2019/0276629 A1 | 9/2019 | Fujishita |

FOREIGN PATENT DOCUMENTS

| | | |
|---|---|---|
| JP | 11-1611 A | 1/1999 |
| JP | 2000-297211 A | 10/2000 |
| JP | 2004-322553 A | 11/2004 |
| JP | 2009-269305 A | 11/2009 |
| JP | 5706897 B2 | 3/2015 |
| JP | 2017-25423 A | 2/2017 |
| WO | WO 2009/051114 A1 | 4/2009 |
| WO | WO 2017/208681 A1 | 12/2017 |
| WO | WO 2018/181319 A1 | 10/2018 |

OTHER PUBLICATIONS

Office Action issued Dec. 14, 2021 in corresponding Japanese Patent Application No. 2018-211337; 5 pages.

International Search Report issued Feb. 10, 2020 in PCT/JP2019/043605 filed Nov. 7, 2019, 3 pages.

Extended European Search Report issued Jul. 20, 2022, (client received Jul. 26, 2022) in corresponding European Patent Application No. 19882821.2, 9 pages.

Combined Chinese Office Action and Search Report issued Aug. 8, 2022, in corresponding Chinese Patent Application No. 201980073548.X (with English Translation of Category of Cited Documents), 7 pages.

* cited by examiner

POROUS LAYER CONSTITUENT AND PRODUCTION METHOD THEREFOR

TECHNICAL FIELD

The present invention relates to a porous layer structure and a method for producing the porous layer structure.

BACKGROUND ART

Polyurethane-based resins are excellent in various physical properties such as wear resistance, flexibility, bendability, softness, processability, adhesiveness and chemical resistance, and are also excellent in suitability for various processing methods. Therefore, polyurethane-based resins are widely used as binders for synthetic artificial leathers (a generic term for artificial leathers and synthetic leathers), various coating agents, inks, paints and the like, or as materials for films, sheets and various molded articles, and polyurethane-based resins suitable for various applications have been proposed.

Among them, a polyurethane resin aqueous dispersion which is capable of being emulsified and dispersed in water by imparting hydrophilicity to a resin is widely used in paints, adhesives, fiber processing agents, paper processing agents, inks, and the like because a coating film excellent in mechanical properties, durability, chemical resistance, wear resistance, and the like can be easily obtained by drying after coating. So far, solvent-based urethanes dissolved in organic solvents have been used for these applications. However, since there are problems such as toxicity of organic solvents, danger of fire, and environmental pollution, in recent years, the solvent-based urethanes have been switched to polyurethane resin aqueous dispersions.

When processing is performed using a polyurethane resin aqueous dispersion, a method of obtaining a porous structure by performing various treatments is widely used for the purpose of improving the texture of a processed product.

For example, PTL 1 proposes a method in which an aqueous dispersion containing (A) a hydrophilic functional group-containing resin, a specific amount of (B) an ammonium salt, and (C) a nonionic viscosity improver is applied to a base material to form a coating film, the coating film is subjected to a heat-sensitive gelation treatment to form a gelled film, and the gelled film is dried and solidified to form a film.

CITATION LIST

Patent Literature

PTL 1: JP 5706897 B

SUMMARY OF INVENTION

Technical Problem

According to PTL 1, it is disclosed that even when the drying efficiency is increased by increasing the drying temperature, the air volume, or the like, the occurrence of cracks or the like on the film surface can be suppressed, the overall production efficiency can be significantly improved, and a thick film can be formed regardless of the base material used. However, as can be seen from the cross-sectional photograph described in PTL 1, most of the air bubbles formed in the film (urethane porous layer) are closed air bubbles, and thus it can be said that improvement is still required in terms of good softness and moisture permeability.

In addition, in the future, it will be necessary to have good crack resistance and peel strength in terms of durability while having the above characteristics.

As described above, an object of the present invention is to provide a porous layer structure having good softness, crack resistance, and peel strength, and a method for producing the porous layer structure.

Solution to Problem

As a result of intensive studies, the present inventors have found that the above problems can be solved by the present invention described below, and have completed the present invention. That is, the present invention is as follows.

[1] A porous layer structure containing a base material and a polyurethane porous layer formed on the base material, wherein a moisture permeability A of the porous layer structure measured by JIS L1099 A-1 (calcium chloride method) is 2000 to 10000 g/(m$^2$·24 h), a moisture permeability loss rate obtained by the following formula from a moisture permeability B of the base material alone measured by JIS L1099 A-1 (calcium chloride method) and the moisture permeability A is 75% or less, Moisture permeability loss rate (%)=(1−(moisture permeability $A$/moisture permeability $B$))×100 and a peel strength at a bonding surface between the base material and the polyurethane porous layer is 0.7 kgf/inch or more.

[2] The porous layer structure as set forth in [1], wherein the polyurethane porous layer has a thickness of 0.1 to 1.0 mm and the polyurethane porous layer has a density of 0.10 to 0.90 g/cm$^3$.

[3] A method for producing the porous layer structure as set forth in [1] or [2], the method including:
  (1) a water-containing base material production step by coating a base material treatment aqueous solution containing a porous layer forming auxiliary agent A containing at least one or more kinds of salts on the base material to produce a water-containing base material;
  (2) a coating film structure production step by coating a foaming composition obtained by subjecting a blended liquid containing a porous layer forming auxiliary agent B containing at least one or more kinds of salts, a foam stabilizer, a water-soluble resin, and a polyurethane resin aqueous dispersion to foaming treatment onto the water-containing base material to form a coating film structure;
  (3) a first drying step of performing drying treatment on the coating film structure;
  (4) a washing step of performing washing after the first drying step; and
  (5) a second drying step of performing drying treatment after the washing step,
  wherein polyurethane resin particles in the polyurethane resin aqueous dispersion contain a polyol component, an isocyanate component, and a hydrophilic alkylene oxide component having one or more active hydrogen groups and having an alkylene oxide, and the content of the hydrophilic alkylene oxide component with respect to the polyurethane resin particles is 1 to 25% by mass.

[4] The method for producing a porous layer structure as set forth in [3], wherein an organic solvent is not substantially used in the water-containing base material production step, the coating film structure production step, and the washing step.

[5] The method for producing a porous layer structure as set forth in [4] or [5], wherein the foaming treatment is mechanical foaming.

Advantageous Effects of Invention

According to the present invention, it is possible to provide a porous layer structure having good softness, crack resistance, and peel strength, and a method for producing the porous layer structure.

DESCRIPTION OF EMBODIMENTS

Figure 1:
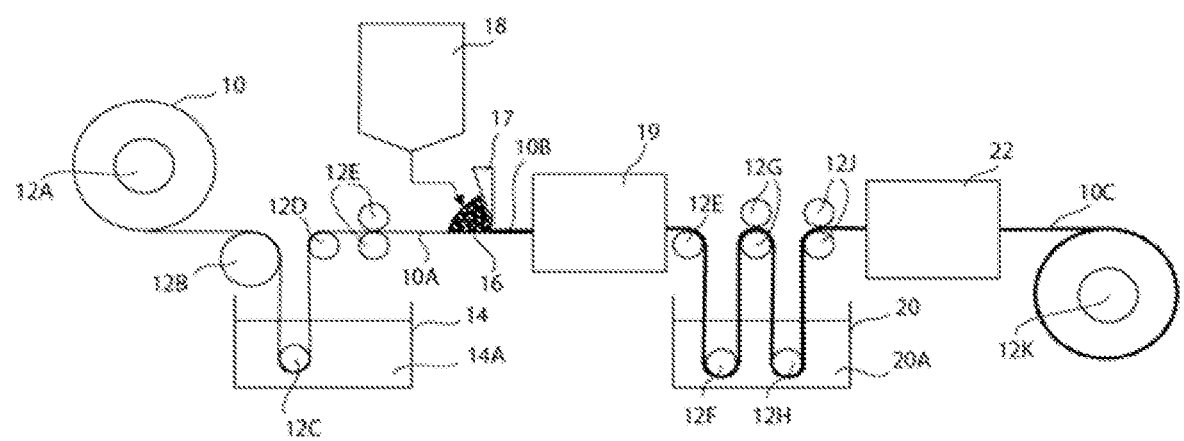
FIG. 1 is a schematic explanatory view for explaining a production process of a porous layer structure according to an embodiment of the present invention.

Hereinafter, the present invention will be described in detail. In the present invention, the polyurethane resin is a generic term for a polyurethane resin and a polyurethane-urea resin.

[1. Porous Layer Structure]

The porous layer structure of the present invention contains a base material and a polyurethane porous layer formed on the base material, and a moisture permeability A of the porous layer structure measured by JIS L1099 A-1 (calcium chloride method) is 2000 to 10000 g/(m$^2$·24 h).

Here, the moisture permeability is measured by JIS L1099 A-1 (calcium chloride method), and the mass of water vapor that has passed through the fiber product (porous layer structure or base material) is converted to the mass per 24 hours at the 1 m$^2$ of the fiber product, and in the case of the present invention, this is used as an indicator of the ease of passage of water vapor in the porous layer.

That is, when the moisture permeability A is so large as to exceed 10000 g/(m$^2$·24 h), it is presumed that the air bubbles formed in the porous layer are continuous air bubbles and continuous air bubbles parallel to the thickness direction are formed. As a result, when a local peeling force is generated, the resin layer is easily broken and cannot be used practically. On the other hand, when the moisture permeability A is 2000 to 10000 g/(m$^2$·24 h) as in the present invention, it is presumed that, for example, air bubbles having large diameters share small holes formed therein to form continuous air bubbles in a complicated form. As a result, even when a local peeling force is generated, high durability (peel strength) can be exhibited as compared with the case where continuous air bubbles parallel to the thickness direction are formed. Further, the porous layer structure of the present invention naturally has moisture permeability and can maintain good softness. When the moisture permeability A is less than 2000 g/(m$^2$·24 h), the moisture permeation performance is insufficient.

The moisture permeability A is preferably 2200 to 10000 g/(m$^2$·24 h), and more preferably 2500 to 10000 g/(m$^2$·24 h).

Further, the moisture permeability loss rate obtained by the following formula from a moisture permeability B of the base material alone of the porous layer structure measured by JIS L1099 A-1 (calcium chloride method) and the moisture permeability A is 75% or less:

$$\text{Moisture permeability loss rate (\%)} = (1-(\text{moisture permeability } A/\text{moisture permeability } B)) \times 100$$

The moisture permeability loss rate indicates the degree of moisture permeability lost by the resin layer (porous layer) or the like formed on the base material with respect to the moisture permeability of the base material alone. When the moisture permeability loss rate exceeds 75%, the moisture permeability of the structure is significantly impaired. The moisture permeability loss rate is preferably 60% or less, and more preferably 50% or less.

The peel strength at the bonding surface between the base material and the polyurethane porous layer is 0.7 kgf/inch or more, preferably 0.75 kgf/inch or more, and more preferably 0.80 kgf/inch or more. If the peel strength is less than 0.7 kgf/inch, sufficient durability cannot be obtained. The peel strength of 0.7 kgf/inch or more in the present invention is presumed to be caused by a complicated form in which air bubbles having large diameters share small holes formed therein to form continuous air bubbles.

From the viewpoint of achieving both good peel strength and softness, the thickness of the polyurethane porous layer is preferably 0.1 to 1.0 mm, and more preferably 0.2 to 0.8 mm.

The density of the polyurethane porous layer in the porous structure is preferably 0.10 to 0.90 g/cm$^3$, more preferably 0.3 to 0.9 g/cm$^3$, and still more preferably 0.4 to 0.8 g/cm$^3$. When the density of the polyurethane porous layer is 0.10 g/cm$^3$ or more, good peel strength can be obtained, and when the density is 0.90 g/cm$^3$ or less, good softness of the obtained structure can be obtained.

Examples of the base material include films, woven fabrics, nonwoven fabrics, and synthetic leathers using the following resins. The base material may be a foamed base material.

Examples of the resin include polyvinyl chloride resin, olefin resins such as polyethylene-based resins, polypropylene-based resins, and thermoplastic polyolefins, ethylene propylene diene-based resins, styrene acrylonitrile-based resins, polysulfone-based resins, polyphenylene ether-based resins, acrylic-based resins, silicone-based resins, fluorine-based resins, polyester-based resins, polyamide-based resins, polyimide-based resins, polystyrene-based resins, polyurethane-based resins, polycarbonate-based resins, norbornene-based resins, cellulose-based resins, polyvinyl alcohol-based resins, polyvinyl formal-based resins, polyvinyl butyral-based resins, polyvinyl pyrrolidone-based resins, polyvinyl acetal-based resins, polyvinyl acetate-based resins, engineering plastics, and biodegradable plastics.

In particular, examples of the interior material for automobiles include polyvinyl chloride resin, thermoplastic polyolefin, polyurethane, and polypropylene.

When the base material is a foamed base material, a base material such as vinyl chloride resin may be used.

The thickness of the base material is preferably 0.2 to 1.5 mm, and when the base material is a foamed base material, and when the base material is foamed, the thickness of the foamed base material is preferably 0.3 to 4.5 mm.

[2. Production Method of Porous Layer Structure]

The method for producing a porous layer structure of the present invention is a method for producing a porous layer structure of the present invention, including:

(1) a water-containing base material production step by coating a base material treatment aqueous solution containing a porous layer forming auxiliary agent A containing at least one or more kinds of salts on the base material to produce a water-containing base material;

(2) a coating film structure production step by coating a foaming composition obtained by subjecting a blended liquid containing a porous layer forming auxiliary agent B containing at least one or more kinds of salts, a foam stabilizer, a water-soluble resin, and a polyurethane resin aqueous dispersion to foaming treatment onto the water-containing base material to form a coating film structure;

(3) a first drying step of performing drying treatment on the coating film structure;

(4) a washing step of performing washing after the first drying step; and (5) a second drying step of performing drying treatment after the washing step.

Hereinafter, each step will be described with reference to FIG. 1.

(Water-Containing Base Material Production Step)

In the water-containing base material production step, as shown in FIG. 1, a base material 10 formed into a roll is fed from a roll 12A, and passes through a base material treatment aqueous solution 14A in a water-containing treatment tank 14 at the position of a roll 12C while being stretched by rolls 12B, 12C, and 12D. As a result, the base material 10 is impregnated with and coated with the base material treatment aqueous solution 14A. Details of the base material 10 are as described above.

The base material treatment aqueous solution 14A contains the porous layer forming auxiliary agent A containing at least one or more kinds of salts.

Examples of the salt in the porous layer forming auxiliary agent A include sulfates and chlorides with ammonium, magnesium, calcium and the like. These are preferably contained in an amount of 5 to 40% by mass in the aqueous solution. When the content is 5 to 40% by mass, solidification of the blended liquid can be promoted.

The water content can be adjusted by the time of clipping in the base material treatment aqueous solution 14A and/or a water content adjusting roll (roll 12E) or the like. Although depending on the type of the base material 10, the water content is preferably, for example, about 200 to 400% by mass with respect to the base material 10.

The temperature of the base material treatment aqueous solution 14A is not particularly limited, but is preferably about 10 to 40° C. The coating method to the base material is not limited to impregnation coating, and coating methods such as spray coating, roll coating, and brush coating can be applied, but in consideration of practicality, impregnation coating is preferable.

After the impregnation coating, the base material 10 fed out is compressed by, for example, a pair of water content adjusting rolls (roll 12E) so as to have a specified water content, and is dehydrated to form a water-containing base material 10A.

(Coating Film Structure Production Step)

The water-containing base material 10A is coated with a predetermined foaming composition 16 in a predetermined thickness by a squeegee 17 to form a coating film structure 10B.

The foaming composition 16 is obtained by subjecting a blended liquid containing the porous layer forming auxiliary agent B containing at least one or more kinds of salts, a foam stabilizer, a water-soluble resin and a polyurethane resin aqueous dispersion to foaming treatment in a foaming tank 18.

Here, examples of the at least one or more kinds of salts of the porous layer forming auxiliary agent B are exemplified by the same as the at least one or more kinds of salts of the porous layer forming auxiliary agent A, and the porous layer forming auxiliary agent B may have the same composition as the porous layer forming auxiliary agent A or may have a different composition. The content of the at least one or more kinds of salts is preferably 5 to 40% by mass in the blended liquid.

Examples of the foam stabilizer contained in the blended liquid include silicone foam stabilizers, nonionic foam stabilizers, and metal salt foam stabilizers. The content of the foam stabilizer in the blended liquid is preferably 0.1 to 3% by mass with respect to the polyurethane resin from the viewpoint of foam retention.

Examples of the water-soluble resin include polysaccharides such as polyvinyl alcohol, methyl cellulose, and xanthan gum, water-soluble polyurethane resins, and water-soluble acrylic resins. The content of the water-soluble resin in the blended liquid is preferably 5 to 40% by mass from the viewpoint of foam retention and film formation assistance.

The amount of the polyurethane resin aqueous dispersion in the blended liquid is adjusted so as to obtain a desired thickness of the urethane porous layer.

The method of the foaming treatment is not particularly limited, but is preferably mechanical foaming in which the raw material is mechanically stirred and air is trapped therein to perform foaming.

As a method for coating the foaming composition 16 onto the water-containing base material 10A, a coating method such as a knife coater, a blade coater, or an MB reverse coater can be applied, but the coating method is not particularly limited, and an optimum coating method can be selected according to the target coating thickness.

The thickness of the coating film after coating is preferably 200 to 2000 μm, and more preferably 600 to 1000 μm from the viewpoint of ensuring foamability.

The adhesion between the base material and the urethane porous layer can be further improved by both the water-containing treatment of the base material in the water-containing base material production step and the coating treatment of the foaming composition in the coating film structure production step.

(First Drying Step)

The coating film structure 10B is fed to a drying apparatus 19 and subjected to drying treatment. The drying temperature is preferably 100 to 150° C., for example. By the drying treatment, the coating film of the coating film structure is solidified, and at the same time, the air bubbles generated by the foaming are partially united with each other, and holes having diameters smaller than the bubble diameters are shared, so that a porous structure 10C in which the continuous air bubbles are formed is obtained.

Since unreacted substances and unnecessary substances are attached to the porous structure 10C in this state, a washing treatment is performed.

(Washing Step)

The porous structure 10C is fed to a washing tank 20 and passed through washing water 20A in the washing tank 20 to be subjected to washing treatment. In the example shown in FIG. 1, the porous structure 10C is fed out while being stretched by the roll 12E, a roll 12F, a pair of rolls 12G, a roll 12H, and a pair of rolls 12J, and passes through the washing water 20A in the washing tank 20 at the positions of the rolls 12F and 12H. The washing can be adjusted by, for example, performing washing at a temperature of the washing water 20 of about 40 to 50° C., increasing the number of rolls to increase the number of times of dipping, or lengthening the dipping time. As a result, washing is sufficiently performed, and the product is sent to a second drying step.

Distilled water is usually used as the washing water.
(Second Drying Step)

The porous structure 10C after the washing step is fed to a drying apparatus 22 and subjected to drying treatment. The drying temperature may be a temperature at which water contained during washing can be sufficiently dried, and is preferably 120 to 150° C., for example.

After the second drying step, the porous structure is wound into a roll by the roll 12J to produce the cleaned porous structure 10C of the present invention.

In the water-containing base material production step, the coating film structure production step, and the washing step, it is preferable that an organic solvent is not substantially used, and it is more preferable that an organic solvent is not used at all.

Here, as the polyurethane resin particles of the polyurethane resin aqueous dispersion blended in the blended liquid in the coating film structure production step, polyurethane resin particles containing a polyol component, an isocyanate component, and a hydrophilic alkylene oxide component having one or more active hydrogen groups and having an alkylene oxide, in which the content of the hydrophilic alkylene oxide component with respect to the polyurethane resin particles is 1 to 25% by mass are used.

Hereinafter, the polyurethane resin aqueous dispersion will be described.
[Polyurethane Resin Aqueous Dispersion]

The polyurethane resin aqueous dispersion according to the present invention is a polyurethane resin aqueous dispersion obtained by dispersing polyurethane resin particles in water, and as described above, the polyurethane resin particles contain a polyol component, an isocyanate component, and a hydrophilic alkylene oxide component having one or more active hydrogen groups and having an alkylene oxide, and the content of the hydrophilic alkylene oxide component with respect to the polyurethane resin particles is 1 to 25% by mass. By using such polyurethane resin particles, the moisture permeability A, the moisture permeability loss rate, and the peel strength can be easily adjusted to desired ranges. The polyurethane resin aqueous dispersion preferably contains a non-volatile content of 40% by mass or more. Furthermore, the volume average particle diameter of the polyurethane resin particles is preferably 0.3 to 5 μm.

In the present invention, since the polyurethane resin particles contain a hydrophilic alkylene oxide component having one or more active hydrogen groups and having an alkylene oxide (hereinafter sometimes simply referred to as "hydrophilic alkylene oxide component") as a constituent component, dispersion stability and film forming properties can be satisfied even when the volume average particle diameter of the polyurethane resin particles is a relatively large particle diameter of 0.3 to 5 μm. In addition, since the volume average particle diameter is 0.3 to 5 μm, the non-volatile content is easily set to 40% by mass or more, and since the non-volatile content is 40% by mass or more, it can be said that the polyurethane resin aqueous dispersion has higher productivity than conventional polyurethane resin aqueous dispersions.

Here, it is presumed that the hydrophilic alkylene oxide component exerts a steric hindrance effect due to the alkylene oxide on the surface of the resin particles, and even when the resin particles having a large particle diameter are precipitated, aggregation is prevented by repulsion between the particles due to the alkylene oxide. As a result, even when the volume average particle diameter is set to 0.3 to 5 μm in order to set the non-volatile content to 40% by mass or more, good dispersion stability can be obtained.

The term "non-volatile component" in the present invention refers to polyurethane resin particles, non-volatile additives, and the like, which will be described later, and specifically refers to a solid component obtained when 2 g of a polyurethane resin aqueous dispersion is dried at 120° C. for 2 hours.

Hereinafter, each component constituting the polyurethane resin particles contained in the polyurethane resin aqueous dispersion will be described in more detail.
<Polyurethane Resin Particles>

The polyurethane resin constituting the polyurethane resin particles according to the present invention mainly contains a polyol component, an isocyanate component, and a hydrophilic alkylene oxide component having one or more active hydrogen groups and having an alkylene oxide.
[Polyol Component]

Examples of the polyol as the polyol component in the present invention include the following (1) to (6).
(1) Polycarbonate Polyol Examples of the polycarbonate polyol include polycarbonate diols such as polytetramethylene carbonate diol, polypentamethylene carbonate diol, polyneopentyl carbonate diol, polyhexamethylene carbonate diol, and poly(1,4-cyclohexanedimethylene carbonate) diol, and random/block copolymers thereof.
(2) Polyether Polyol Examples of the polyether polyol include those obtained by polymerizing or copolymerizing any of alkylene oxides (ethylene oxide, propylene oxide, butylene oxide, and the like) and heterocyclic ethers (tetrahydrofuran and the like). Specific examples thereof include polypropylene glycol, polyethylene glycol-polytetramethylene glycol (block or random), polytetramethylene ether glycol, and polyhexamethylene glycol.

The content ratio of ethylene oxide (EO) in the polyether polyol is less than 50% by mass.
(3) Polyester Polyol Examples of the polyester polyol include polycondensation products of at least one of aliphatic dicarboxylic acids (for example, succinic acid, adipic acid, sebacic acid, glutaric acid, and azelaic acid) and aromatic dicarboxylic acids (for example, isophthalic acid and terephthalic acid) and low molecular weight glycols (for example, ethylene glycol, 1,2-propylene glycol, 1,3-propylene glycol, 1,3-butanediol, 1,4-butylene glycol, 1,5-pentanediol, 1,6-hexamethylene glycol, neopentyl glycol, and 1,4-bishydroxymethylcyclohexane).

Specific examples thereof include polyethylene adipatediol, polybutylene adipatediol, polyhexamethylene adipatediol, polyneopentyl adipatediol, polyethylene/butylene adipatediol, polyneopentyl/hexyl adipatediol, poly-3-methylpentaneadipatediol, and polybutylene isophthalate diol.
(4) Polylactone Polyol Examples of the polylactone polyol include polycaprolactone diol and poly-3-methylvalerolactone diol.
(5) Polyolefin Polyol Examples of the polyolefin polyol include polybutadiene glycol and polyisoprene glycol, or hydrides thereof.
(6) Polymethacrylate Diol Examples of the polymethacrylate diol include α,ω-polymethyl methacrylate diol and α,ω-polybutyl methacrylate diol.

The number average molecular weight of the polyol is not particularly limited as long as it is 500 or more, but is preferably about 500 to 4000, and more preferably about 1000 to 3000. These polyols may be used alone or in combination of two or more, but from the viewpoint of long-term durability, it is preferable to contain a polycarbonate diol.

The number average molecular weight is a number average molecular weight in terms of polystyrene, and can be usually determined by measurement of gel permeation chromatography (GPC).

[Isocyanate Component]

The isocyanate serving as the isocyanate component in the present invention is not particularly limited, but is preferably a bifunctional polyisocyanate such as an aliphatic diisocyanate, an alicyclic diisocyanate, or an aromatic diisocyanate.

Specific examples of the polyisocyanate include tolylene diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanate-diphenyl ether, mesitylene diisocyanate, 4,4'-diphenylmethane diisocyanate, durylene diisocyanate, 1,5-naphthalene diisocyanate, benzidine diisocyanate, o-nitrobenzidine diisocyanate, 4,4-diisocyanate dibenzyl, 1,4-tetramethylene diisocyanate, 1,5-pentamethylene diisocyanate, 1,6-hexamethylene diisocyanate, 1,10-decamethylene diisocyanate, 1,4-cyclohexylene diisocyanate, xylene diisocyanate, 4,4'-methylenebis(cyclohexyl isocyanate), 1,5-tetrahydronaphthalene diisocyanate, isophorone diisocyanate, and dicyclohexylmethane 4,4'-diisocyanate. Among these, it is preferable to contain at least dicyclohexylmethane 4,4'-diisocyanate.

In the case where softness, mechanical properties, and color fastness are required as in vehicle applications or light color applications, it is preferable to use an aliphatic diisocyanate or an alicyclic diisocyanate in combination with 4,4'-diphenylmethane diisocyanate.

The ratio of the isocyanate group equivalent of the polyisocyanate component to the hydroxy group equivalent of all components (NCO/OH) is preferably 1.1 to 2.2, and more preferably 1.2 to 1.9. When NCO/OH is 1.2 to 1.9, both softness and durability are more favorable.

[Hydrophilic Alkylene Oxide Component Having One or More Active Hydrogen Groups and Having Alkylene Oxide]

The hydrophilic alkylene oxide component having one or more active hydrogen groups and having an alkylene oxide imparts water dispersibility to the polyurethane resin particles. The reason why good water dispersibility is obtained is not clear, but it is presumed that the alkylene oxide protrudes into water so as to extend from the surface of the polyurethane resin particle, and this exerts a steric hindrance effect of preventing other polyurethane resin particles from approaching.

In the hydrophilic alkylene oxide component, the active hydrogen is a hydrogen atom which reacts with an isocyanate group of isocyanate, and examples thereof include hydrogen atoms in a hydroxy group, a mercapto group, an amino group, and the like, and among these, a hydrogen atom of a hydroxy group is preferable.

In addition, the alkylene oxide serves as a hydrophilic group exhibiting hydrophilicity and contributes to the water dispersibility of the polyurethane resin particles. The number of carbon atoms of the alkylene oxide is preferably 2 to 12, and specific examples thereof include ethylene oxide, 1,2- or 1,3-propylene oxide, 1,2-, 2,3- or 1,3-butylene oxide, tetrahydrofuran, 3-methyltetrahydrofuran, α-olefin oxide, styrene oxide, and epihalohydrin (such as epichlorohydrin). Among these, the alkylene oxide preferably contains an ethylene oxide.

The content of the repeating unit of ethylene oxide in the hydrophilic component having an alkylene oxide is preferably at least 50% by mass or more, more preferably 70% by mass or more, and the alkylene oxide is still more preferably ethylene oxide.

Examples of the compound serving as the hydrophilic alkylene oxide component include polyethylene glycol, polyoxyethylene-polyoxypropylene copolymer glycol, polyoxyethylene-polyoxybutylene copolymer glycol, polyoxyethylene-polyoxyalkylene copolymer glycol, monoalkyl ethers thereof such as methyl ether, ethyl ether, and butyl ether, and diol adducts of polyalkylene glycol monoalkyl ethers obtained by adding a diol such as 1,3-diol to these monoalkyl ethers.

Among these, polyethylene glycol; polyethylene glycol monoalkyl ethers such as polyethylene glycol monomethyl ether and polyethylene glycol monoethyl ether; and diol adducts of polyethylene glycol monoalkyl ethers obtained by adding a diol such as 1,3-diol to polyethylene glycol monoalkyl ethers are preferable.

Particularly, polyethylene glycol monoalkyl ethers and diol adducts of polyethylene glycol monoalkyl ethers are more preferable, and diol adducts of polyethylene glycol monoalkyl ethers are still more preferable, from the viewpoint of not only further improving dispersion stability but also improving redispersibility and exhibiting excellent heat resistance.

These are presumed to take a form suitable for exhibiting dispersibility and thermal stability in polyurethane resin particles.

The number average molecular weight of the compound serving as the hydrophilic alkylene oxide component is preferably 500 to 3000, and more preferably 700 to 2000.

Examples of commercially available products of polyethylene glycol include "PEG #200", "PEG #300", "PEG #400", "PEG #600", "PEG #1000", "PEG #1500", "PEG #1540", and "PEG #2000" manufactured by NOF Corporation.

Examples of commercially available products of polyethylene glycol monomethyl ether include "UNIOX M-400", "UNIOX M-550", "UNIOX M-1000", and "UNIOX M-2000" manufactured by NOF Corporation.

Examples of commercially available products of a diol adduct of polyethylene glycol monoalkylether include "TEGOMER D3403" manufactured by Evonik Industries.

The above compounds are examples of preferred components, and the present invention is not limited thereto. Accordingly, not only the compounds exemplified above but also other compounds which are currently commercially available and easily available from the market can be used.

The content of the hydrophilic alkylene oxide component with respect to the polyurethane resin particles is 1 to 25% by mass, preferably 3 to 20% by mass, and more preferably 5 to 10% by mass. When the content is less than 1% by mass, the dispersion stability is lowered, or the film forming properties are lowered to cause cracks. When the content is more than 25% by mass, there is a possibility that the mechanical properties are deteriorated and the viscosity of the aqueous dispersion is increased, leading to deterioration in workability and deterioration in non-volatile content.

When the hydrophilic alkylene oxide component is contained in an amount of 1 to 20% by mass, the rate of drying (evaporation of moisture) during film formation can be reduced, and the occurrence of cracks can be suppressed.

[Volume Average Particle Diameter of Polyurethane Resin Particles]

The volume average particle diameter of the polyurethane resin particles of the present invention is 0.3 to 5 μm. When the volume average particle diameter of the polyurethane resin particles is less than 0.3 μm, the viscosity of the aqueous dispersion increases, and it becomes necessary to decrease the non-volatile content. On the other hand, when the volume average particle diameter exceeds 5 μm, the particles are easily precipitated.

From such a viewpoint, the volume average particle diameter of the polyurethane resin particles is preferably 0.3 to 5.0 μm, more preferably 0.3 to 3.0 μm, and still more preferably 0.3 to 1.5 μm.

[Viscosity of Polyurethane Resin Aqueous Dispersion]

The viscosity of the polyurethane resin aqueous dispersion at 25° C. is preferably 3000 mPa·s or less, more preferably 2000 mPa·s or less. When the viscosity is 2000 mPa·s or less, it is easy to remove foreign substances (filtering or the like) during production, and the production efficiency can be improved.

[Production Method of Polyurethane Resin Aqueous Dispersion]

Examples of the method for producing a polyurethane resin aqueous dispersion in the present invention include (1) a method including a reaction step in which a polyol, a compound serving as a hydrophilic alkylene oxide component, and an isocyanate are reacted, and an emulsification and molecular weight increasing step in which a surfactant or the like is added to a reaction mixture after the reaction, a mixed solution of ion exchange water and a diamine or the like is added thereto to emulsify and increase the molecular weight of the mixture, wherein the mixture is stirred gently at about 100 to 300 rpm when the surfactant or the like is added in the emulsification and molecular weight increasing step, and the mixture is stirred strongly at about 4000 to 6000 rpm when the mixed solution of ion exchange water and a diamine or the like is added, and (2) a method of reacting and emulsifying at least a polyol, an isocyanate, and a compound serving as a hydrophilic alkylene oxide component in a stirring tank having a stirring blade for in-tank circulation and a stirring blade for imparting a shearing force.

According to the production method, polyurethane resin particles having the above-described volume average particle diameter can be efficiently produced at the above-described high non-volatile component concentration. In addition, a desired viscosity can be obtained.

Specifically, in the method (2), the polyurethane resin aqueous dispersion of the present invention can be produced by reacting a polyol, optionally added short-chain diol, an isocyanate, and a compound serving as a hydrophilic alkylene oxide component in a reaction vessel (the above-mentioned stirring tank) equipped with a stirring blade capable of handling an ultra-high viscosity liquid capable of achieving homogenization, and then adding a chain extender such as a short-chain diamine, a chain extension terminator, a surfactant, and ion-exchanged water as a dispersion medium, followed by reaction while emulsifying.

A chain extender such as a short-chain diol or a short-chain diamine, a chain extension terminator, and the like may be appropriately added also in the method (1).

Examples of the stirring tank include a stirring apparatus having two or more stirring blades in the stirring tank, for example, two stirring blades for the purpose of in-tank circulation and one stirring blade for imparting a shearing force for the purpose of imparting a high shearing force into the tank. Among these, a stirring apparatus having stirring blades at three positions of an upper portion, a bottom portion, and an intermediate portion between the upper portion and the bottom portion in the reaction vessel is preferable. Specific examples thereof include a high-viscosity high-shear composite stirring apparatus (product name: NANOVisK, manufactured by Sumitomo Heavy Industries Process Equipment Co., Ltd.) and a vacuum emulsification stirring apparatus (manufactured by Mizuho Industrial Co., Ltd.).

In the production methods (1) and (2) described above, if necessary, the reaction may be carried out using an organic solvent, and then the organic solvent may be removed under reduced pressure to produce a polyurethane resin aqueous dispersion.

Examples of the organic solvent include ketone solvents (such as acetone, methyl ethyl ketone, methyl isobutylketone, and cyclohexanone), aromatic hydrocarbon solvents (such as toluene, xylene, Swazole (an aromatic hydrocarbon solvent manufactured by Cosmo Oil Co., Ltd.), and Sorbesso (an aromatic hydrocarbon solvent manufactured by Exxon Mobil Corporation)), and aliphatic hydrocarbon solvents (such as n-hexane). Among these, methyl ethyl ketone, acetone, tetrahydrofuran, and the like are preferable from the viewpoint of handling property.

Examples of the surfactant include a non-reactive nonionic surfactant.

Examples of the nonionic surfactant include glycol ethers such as polyoxyethylene alkyl ether, and acetylene glycol.

Examples of the short-chain diamine include aliphatic diamine compounds such as ethylenediamine, trimethylenediamine, hexamethylenediamine, and octamethylenediamine; aromatic diamine compounds such as phenylenediamine, 3,3'-dichloro-4,4'-daminodiphenylmethane, 4,4'-methylenebis(phenylamine), 4,4'-daminodiphenylether, and 4,4'-diaminodiphenylsulfone; alicyclic diamine compounds such as cyclopentanediamine, cyclohexylodiamine, 4,4-diaminodicyclohexylmethane, 1,4-diaminocyclohexane, and isophoronediamine; and hydrazines such as hydrazine, carbodihydrazide, adipic acid dihydrazide, sebacic acid dihydrazide, and phthalic acid dihydrazide. Among these, hydrazine (hydrazine hydrate) is more preferable.

The short chain diol is a compound having a number average molecular weight of less than 500, and examples thereof include aliphatic glycols such as ethylene glycol, 1,2-propane diol, 1,3-propane diol, 1,3-butane diol, 1,4-butane 1,6-hexane diol, and neopentyl glycol, and alkylene oxide low molecular adducts thereof (having a number average molecular weight of less than 500); alkylene ether glycols such as diethylene glycol, triethylene glycol, and dipropylene glycol; alicyclic glycols such as 1,4-bishydroxymethyl cyclohexane and 2-methyl-1,1-cyclohexane dimethanol, and alkylene oxide low molecular adducts thereof (having a number average molecular weight of less than 500); aromatic glycols such as xylylene glycol and alkylene oxide low molecular adducts thereof (having a number average molecular weight of less than 500); bisphenols such as bisphenol A, thiobisphenol, and sulfone bisphenol, and alkylene oxide low molecular adducts thereof (having a number average molecular weight of less than 500); and compounds such as alkyl dialkanolamines such as alkyl diethanolamines of C1 to C18. Among these, aliphatic glycols are preferable.

<Amount of Non-volatile Component in Polyurethane Resin Aqueous Dispersion>

In the present invention, since the amount of the non-volatile component in the polyurethane resin aqueous dispersion is 40% by mass or more, the amount of the volatile component which is discharged to the outside of the system by being volatilized in the drying step is small, and the amount of energy required for drying can be reduced.

In the present invention, from the viewpoint of reducing the amount of energy used in the drying step, the amount of the non-volatile component in the polyurethane resin aqueous dispersion is preferably 41% by mass or more, and more preferably 45% by mass or more. The upper limit is not particularly limited, but is, for example, about 70% by mass.

Since the polyurethane resin aqueous dispersion of the present invention has a small amount of volatile components as described above, the volatile components can be removed more easily than before, and the polyurethane resin particles can be fused and formed into a film through the drying step. The term "formed into a film" as used herein means that, for example, the polyurethane resin aqueous dispersion of the present invention is coated on a release paper so as to have a film thickness of 40 μm, dried at 120° C. for 5 minutes, and then can be peeled from the release paper while maintaining the film form.

<Additive>

The polyurethane resin aqueous dispersion of the present invention may contain an additive as necessary. Examples of the additive include a matting agent, an antioxidant (hindered phenol type, phosphite type, thioether type, etc.), a light stabilizer (hindered amine type, etc.), an ultraviolet absorber (benzophenone type, benzotriazole type, etc.), a gas discoloration stabilizer (hydrazine type, etc.), and a metal deactivator.

Examples of the matting agent include resin particles, silica particles, talc, aluminum hydroxide, calcium sulfate, calcium silicate, calcium carbonate, magnesium carbonate, barium carbonate, alumina silicate, molecular sieve, kaolin, mica, and mica. When the polyurethane resin aqueous dispersion of the present invention contains the matting agent, the coating film serving as a skin material can have a matte tone.

Figure 2:
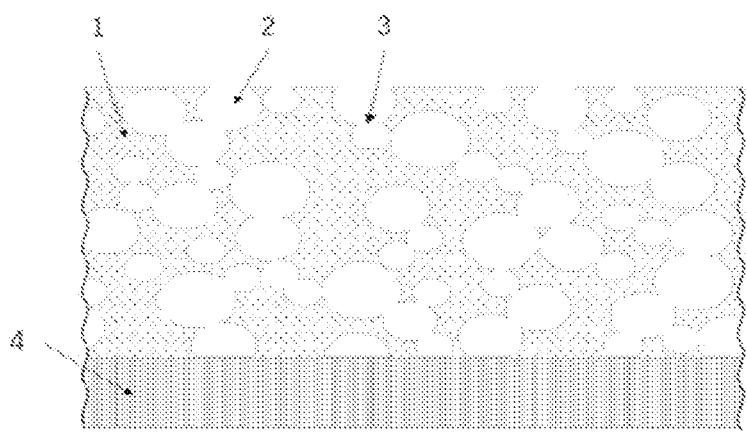
FIG. 2 is a schematic cross-sectional view showing an estimated cross-sectional structure of a porous layer structure according to an embodiment of the present invention.

When the cross section of the porous layer structure of the present invention as described above is observed with an electron microscope, as shown in FIG. 2, air bubbles 2 generated by foaming in a polyurethane porous layer 1 on a base material 4 are partially united with each other to share holes 3 having a diameter smaller than the bubble diameter, thereby forming continuous air bubbles. Such a configuration provides a porous layer structure having good softness, crack resistance, and peel strength.

The porous layer structure of the present invention can be preferably applied to natural leathers, and synthetic artificial leathers such as synthetic imitation leathers and artificial leathers, plastic sheet-shaped articles, various films, plastic molded articles, rubber molded articles and the like.

EXAMPLES

Hereinafter, the present invention will be described in more detail with reference to Examples and Comparative Examples, but the present invention is not limited thereto. In addition, in the following, "part" indicates part by mass, and "%" indicates % by mass.

<Preparation of PUD1 to PUD12 and Comparative PUD1 to Comparative PUD8 which are Polyurethane Resin Aqueous Dispersions>

[Synthesis Step of Terminal NCO Group-Containing Urethane Prepolymer]

A reaction vessel equipped with a stirrer, a reflux condenser, a thermometer, a nitrogen blowing tube, and a manhole was purged with nitrogen gas, and then a polyol, a chain extender, a compound to be a hydrophilic alkylene oxide component as a hydrophilic component, and an isocyanate were charged in accordance with the formulations shown in Table 1 and Table 2. The mixture was heated with stirring and reacted at 95° C. to obtain a urethane prepolymer having an NCO group at the terminal.

The ratio (NCO/OH) of the isocyanate group equivalent of the polyisocyanate component to the hydroxy group equivalent of all components was 1.5.

[Emulsification and Molecular Weight Increasing Reaction]

The obtained terminal NCO group-containing urethane prepolymer is transferred to a stainless steel vessel, and gently stirred at 100 to 300 rpm for 5 minutes using a T.K. homodisper (manufactured by PRIMIX Corporation) equipped with a disper blade having a diameter of 50 mm. Subsequently, a surfactant was added according to the formulation shown in Tables 1 and 2, and a neutralizing agent was also added in the case of Comparative PUD7 and Comparative PUD8, followed by stirring until uniform. After it was confirmed that the inside of the system was uniform, a mixed solution of ion-exchanged water (dispersant) and a diamine was added in accordance with the formulations shown in Tables 1 and 2 while strongly stirring at 4000 to 6000 rpm for 10 minutes, and the mixture was emulsified to increase the molecular weight. Thus, polyurethane resin aqueous dispersions PUD1 to PUD12 and Comparative PUD1 to Comparative PUD8 were obtained.

<Polyurethane Raw Materials>

Polyol A: UH-100 (polycarbonate diol; number average molecular weight: 1000) manufactured by Ube Industries, Ltd.

Compound B serving as a hydrophilic alkylene oxide component: PEG1000 (polyethylene glycol; number average molecular weight: 1000) manufactured by Ube Industries, Ltd.

Compound C serving as a hydrophilic alkylene oxide component: TEGOMER D3403 (polyethylene glycol monomethyl ether-1,3-diol; number average molecular weight: 1000) manufactured by Evonik Industries Compound D serving as a hydrophilic alkylene oxide component: UNIOX M-1000 (polyoxyethylene monomethyl ether; number average molecular weight: 1000) manufactured by NOF Corporation Hydrophilic component E: Bis-MPA (dimethylolpropionic acid)

Chain extender F: 1,4-butanediol

Isocyanate G: Desmodur W (dicyclohexylmethane 4,4'-diisocyanate) manufactured by Sumika Covestro Urethane Co., Ltd.

Diamine H: 60% hydrated hydrazine

Surfactant I: Newcol 2306-Y (polyoxyalkylene alkyl ether; EOPO nonionic surfactant) manufactured by Nippon Nyukazai Co., Ltd.

Neutralizing agent J: triethylamine

Dispersion medium K: ion-exchanged water (Measurement of Non-volatile Content)

The weight of the stainless steel vessel is measured by an electronic balance ($g0$), and 2 g of each obtained polyurethane aqueous dispersion is weighed in the stainless steel vessel ($g1$). Next, the stainless steel vessel in which the polyurethane aqueous dispersion is weighed is dried at 120° C. for 2 hours, and the weight after drying is measured ($g2$). The non-volatile content was measured from each of the obtained weights and the following formula (1).

$$\text{Non-volatile content (\% by mass)} = (g2-g0)/(g1-g0) \times 100 \tag{1}$$

(Acid Value)

The acid values of Comparative PUD7 and Comparative PUD8 were calculated from the blending amounts of hydrophilic components and the like.

Mfg. Co., Ltd.), and a polyurethane resin aqueous dispersion in the proportions shown in Tables 3 and 4 was prepared. The blended liquid was stirred with a disper blade at 3000 rpm for 2 minutes to perform a foaming treatment by

TABLE 1

| Sample name | | PUD1 | PUD2 | PUD3 | PUD4 | PUD5 | PUD6 | PUD7 | PUD8 | PUD9 | PUD10 | PUD11 | PUD12 |
|---|---|---|---|---|---|---|---|---|---|---|---|---|---|
| Polyol | A | 90.0 | 97.0 | 70.0 | 65.0 | 90.0 | 97.0 | 70.0 | 65.0 | 90.0 | 97.0 | 70.0 | 65.0 |
| Hydrophilic | B | 10.0 | 3.0 | 30.0 | 35.0 | — | — | — | — | — | — | — | — |
| component | C | — | — | — | — | 10.0 | 3.0 | 30.0 | 35.0 | — | — | — | — |
| | D | — | — | — | — | — | — | — | — | 10.0 | 3.0 | 30.0 | 35.0 |
| | E | — | — | — | — | — | — | — | — | — | — | — | — |
| Chain extender | F | 2.0 | 2.0 | 2.0 | 2.0 | 2.0 | 2.0 | 2.0 | 2.0 | 2.0 | 2.0 | 2.0 | 2.0 |
| Isocyanate | G | 48.5 | 48.5 | 48.5 | 48.5 | 48.5 | 48.5 | 48.5 | 48.5 | 46.0 | 47.5 | 45.0 | 45.0 |
| Diamine | H | 5.0 | 5.0 | 5.0 | 5.0 | 5.0 | 5.0 | 5.0 | 5.0 | 5.0 | 5.0 | 5.0 | 5.0 |
| Surfactant | I | 1.5 | 1.5 | 1.5 | 1.5 | 1.5 | 1.5 | 1.5 | 1.5 | 1.5 | 1.5 | 1.5 | 1.5 |
| Neutralizing agent | J | — | — | — | — | — | — | — | — | — | — | — | — |
| Dispersion medium | K | 155.0 | 125.0 | 220.0 | 230.0 | 155.0 | 125.0 | 220.0 | 230.0 | 155.0 | 125.0 | 220.0 | 230.0 |
| Hydrophilic component content [wt %] (Comparison of PU resin solid content) | | 6.4 | 1.9 | 19.3 | 22.5 | 6.4 | 1.9 | 19.3 | 22.5 | 6.5 | 1.9 | 19.7 | 23.0 |
| Acid value (in PU resin) | | — | — | — | — | — | — | — | — | — | — | — | — |
| Non-volatile content [mass %] | | 50.8 | 55.7 | 42.3 | 40.6 | 51.2 | 56.0 | 41.3 | 40.3 | 50.1 | 54.8 | 41.1 | 40.7 |

The numerical values of the formulations in Tables 1 and 2 are parts by mass.

TABLE 2

| Sample name | | Comparative PUD1 | Comparative PUD2 | Comparative PUD3 | Comparative PUD4 | Comparative PUD5 | Comparative PUD6 | Comparative PUD7 | Comparative PUD8 |
|---|---|---|---|---|---|---|---|---|---|
| Polyol | A | 99.0 | 60.0 | 99.0 | 60.0 | 99.0 | 60.0 | 90.0 | 97.0 |
| Hydrophilic | B | 1.0 | 40.0 | — | — | — | — | — | — |
| component | C | — | — | 1.0 | 40.0 | — | — | — | — |
| | D | — | — | — | — | 1.0 | 40.0 | — | — |
| | E | — | — | — | — | — | — | 10.0 | 3.0 |
| Chain extender | F | 2.0 | 2.0 | 2.0 | 2.0 | 2.0 | 2.0 | 2.0 | 2.0 |
| Isocyanate | G | 48.5 | 48.5 | 48.0 | 42.5 | 48.0 | 42.5 | 74.0 | 56.0 |
| Diamine | H | 5.0 | 5.0 | 5.0 | 5.0 | 5.0 | 5.0 | 13.0 | 7.5 |
| Surfactant | I | 1.5 | 1.5 | 1.5 | 1.5 | 1.5 | 1.5 | 2.0 | 1.5 |
| Neutralizing agent | J | — | — | — | — | — | — | 7.5 | 2.3 |
| Dispersion medium | K | 125.0 | 280.0 | 155.0 | 280.0 | 155.0 | 280.0 | 450.0 | 140.0 |
| Hydrophilic component content [wt %] (Comparison of PU resin solid content) | | 0.6 | 25.7 | 0.6 | 26.8 | 0.6 | 26.8 | 5.3 | 1.8 |
| Acid value (in PU resin) | | — | — | — | — | — | — | 22.2 | 7.6 |
| Non-volatile content [mass %] | | 55.4 | 35.6 | 54.5 | 34.5 | 55.1 | 36.5 | 29.6 | 54.5 |

<Production of Porous Layer Structure>

A water-containing base material was prepared by dip-coating a base material (polyester circular knitted base fabric, thickness 1 mm) in a 20% by mass ammonium sulfate aqueous solution or 20% by mass magnesium chloride aqueous solution as a porous layer forming auxiliary agent for impregnating a base fabric (a porous layer forming auxiliary agent A) (water-containing base material production step). The water content was 200 to 400% by mass.

A blended liquid containing a porous layer forming auxiliary agent B (20% by mass ammonium sulfate aqueous solution or 20% by mass magnesium chloride aqueous solution), a silicone additive (silicone foam stabilizer manufactured by Shin-Etsu Chemical Co., Ltd.), a water-soluble resin (15% by mass polyvinyl alcohol aqueous solution), a polyurethane-based viscosity improver (RESAMINE D-870T manufactured by Dainichiseika Color & Chemicals thickness of 1000 μm to obtain a coating film structure (coating film structure production step).

Thereafter, the coating film structure was subjected to a drying treatment at 150° C. for 5 to 10 minutes (first drying step).

After completion of drying, the remaining porous layer forming auxiliary agent and the like were washed in a hot water bath at 45° C. (washing step).

After it was confirmed that the washing was sufficiently performed, excessive moisture was removed, and drying treatment was performed under conditions of 120° C. for 5 to 10 minutes (second drying step), thereby obtaining porous layer structures (synthetic artificial leathers) of Examples 1 to 24 and Comparative Examples 1 to 20.

<Density of Urethane Porous Layer>

The produced porous layer structure was cut into a size of 10 cm×10 cm square, and the density of the urethane porous layer was calculated by the following formula.

(1) Weight Measurement and Calculation of Porous Layer Structure

The weight (C) of the urethane porous layer was determined from the weight (A) of the entire porous layer structure and the weight (B) of the coated base material by the following formula: C=A−B (g).

(2) Thickness Measurement and Calculation of Porous Layer Structure

The thickness (F) of the urethane porous layer was determined from the thickness (D) of the entire porous layer structure and the thickness (E) of the coated base material by the following formula: F=D−E (cm).

(3) Calculation of Density of Urethane Porous Layer

The density of the urethane porous layer was determined by the following formula.

Density of urethane porous layer=C÷(F×10×10) (g/cm$^3$)

<Evaluation Method>

(Surface Crack Evaluation Method)

The presence or absence of cracks having a length of 1 mm or more existing in the central portion of the produced porous layer structure in the range of 10 cm×10 cm is visually confirmed and evaluated.

A: no crack, C: with crack (Peeling Evaluation)

Polyco tape No. 6000 (manufactured by Okuda Sangyo Co., Ltd.) was thermocompression-bonded to the resin-coated surface of the produced porous layer structure, and the T-type peel strength was measured with an autograph (manufactured by Shimadzu Corporation).

(Moisture Permeability)

A test piece was cut out from the produced porous layer structure, and the moisture permeability A of the porous layer structure was evaluated according to JIS L1099 A-1 (calcium chloride method).

(Moisture Permeability Loss Rate)

The moisture permeability A of the produced porous layer structure and the moisture permeability B of the base material used in the structure were measured, and the moisture permeability loss rate was calculated by the following formula.

Moisture permeability loss rate (%)=(1−(moisture permeability $A$ of porous layer structure/moisture permeability $B$ of base material))×100

The moisture permeability B of the base material was evaluated by cutting out the base material used for producing the porous layer structure and evaluating the moisture permeability according to JIS L1099 A-1 (calcium chloride method).

TABLE 3

| | | Ex. 1 | Ex. 2 | Ex. 3 | Ex. 4 | Ex. 5 | Ex. 6 |
|---|---|---|---|---|---|---|---|
| Polyurethane aqueous dispersion | PUD1 | 100 | — | — | — | — | — |
| | PUD2 | — | 100 | — | — | — | — |
| | PUD3 | — | — | 100 | — | — | — |
| | PUD4 | — | — | — | 100 | — | — |
| | PUD5 | — | — | — | — | 100 | — |
| | PUD6 | — | — | — | — | — | 100 |
| | PUD7 | — | — | — | — | — | — |
| | PUD8 | — | — | — | — | — | — |
| | PUD9 | — | — | — | — | — | — |
| | PUD10 | — | — | — | — | — | — |
| | PUD11 | — | — | — | — | — | — |
| | PUD12 | — | — | — | — | — | — |
| Porous layer forming auxiliary agent B | 20% $(NH_4)_2SO_4$aq | 15 | 15 | 15 | 15 | 15 | 15 |
| | 20% $MgCl_2$aq | — | — | — | — | — | — |
| Silicone additive | SH-193 | 1.0 | 1.0 | 1.0 | 1.0 | 1.0 | 1.0 |
| Water-soluble resin | 15% PVAaq | 30 | 30 | 30 | 30 | 30 | 30 |
| Viscosity improver | D-890T | 1.0 | 1.0 | 1.0 | 1.0 | 1.0 | 1.0 |
| Porous layer forming auxiliary agent for impregnating base fabric | | 20% $(NH_4)_2SO_4$ | 20% $(NH_4)_2SO_4$ | 20% $(NH_4)_2SO_4$ | 20% $(NH_4)_2SO_4$ | 20% $(NH_4)_2SO_4$ | 20% $(NH_4)_2SO_4$ |
| Surface crack | | A | A | A | A | A | A |
| Urethane porous layer density [g/cm$^3$] | | 0.59 | 0.56 | 0.66 | 0.78 | 0.73 | 0.44 |
| Urethane porous layer thickness [mm] | | 0.37 | 0.38 | 0.38 | 0.38 | 0.4 | 0.41 |
| Peel strength [kgf/inch] | | 0.88 | 0.91 | 0.78 | 0.72 | 0.83 | 0.96 |
| Moisture permeability A [g/m$^2$ · 24 h] | | 3900 | 2900 | 4100 | 4000 | 3500 | 3000 |
| Moisture permeability loss rate | | 27.1% | 45.8% | 23.4% | 25.2% | 34.6% | 43.9% |
| | | Ex. 7 | Ex. 8 | Ex. 9 | Ex. 10 | Ex. 11 | Ex. 12 |
| Polyurethane aqueous dispersion | PUD1 | — | — | — | — | — | — |
| | PUD2 | — | — | — | — | — | — |
| | PUD3 | — | — | — | — | — | — |
| | PUD4 | — | — | — | — | — | — |
| | PUD5 | — | — | — | — | — | — |
| | PUD6 | — | — | — | — | — | — |
| | PUD7 | 100 | — | — | — | — | — |
| | PUD8 | — | 100 | — | — | — | — |
| | PUD9 | — | — | 100 | — | — | — |
| | PUD10 | — | — | — | 100 | — | — |

TABLE 3-continued

|  |  |  |  |  |  |  |  |
|---|---|---|---|---|---|---|---|
|  | PUD11 | — | — | — | — | 100 | — |
|  | PUD12 | — | — | — | — | — | 100 |
| Porous layer forming auxiliary agent B | 20% $(NH_4)_2SO_4$aq | 15 | 15 | 15 | 15 | 15 | 15 |
|  | 20% $MgCl_2$aq | — | — | — | — | — | — |
| Silicone additive | SH-193 | 1.0 | 1.0 | 1.0 | 1.0 | 1.0 | 1.0 |
| Water-soluble resin | 15% PVAaq | 30 | 30 | 30 | 30 | 30 | 30 |
| Viscosity improver | D-890T | 1.0 | 1.0 | 1.0 | 1.0 | 1.0 | 1.0 |
| Porous layer forming auxiliary agent for impregnating base fabric |  | 20% $(NH_4)_2SO_4$ | 20% $(NH_4)_2SO_4$ | 20% $(NH_4)_2SO_4$ | 20% $(NH_4)_2SO_4$ | 20% $(NH_4)_2SO_4$ | 20% $(NH_4)_2SO_4$ |
| Surface crack |  | A | A | A | A | A | A |
| Urethane porous layer density [g/cm³] |  | 0.78 | 0.80 | 0.57 | 0.56 | 0.41 | 0.76 |
| Urethane porous layer thickness [mm] |  | 0.41 | 0.37 | 0.44 | 0.44 | 0.38 | 0.36 |
| Peel strength [kgf/inch] |  | 0.81 | 0.78 | 0.85 | 0.89 | 0.75 | 0.72 |
| Moisture permeability A [g/m² · 24 h] |  | 3900 | 4400 | 3200 | 3100 | 4000 | 4100 |
| Moisture permeability loss rate |  | 27.1% | 17.8% | 40.2% | 42.1% | 25.2% | 23.4% |

|  |  | Ex. 13 | Ex. 14 | Ex. 15 | Ex. 16 | Ex. 17 | Ex. 18 |
|---|---|---|---|---|---|---|---|
| Polyurethane aqueous dispersion | PUD1 | 100 | — | — | — | — | — |
|  | PUD2 | — | 100 | — | — | — | — |
|  | PUD3 | — | — | 100 | — | — | — |
|  | PUD4 | — | — | — | 100 | — | — |
|  | PUD5 | — | — | — | — | 100 | — |
|  | PUD6 | — | — | — | — | — | 100 |
|  | PUD7 | — | — | — | — | — | — |
|  | PUD8 | — | — | — | — | — | — |
|  | PUD9 | — | — | — | — | — | — |
|  | PUD10 | — | — | — | — | — | — |
|  | PUD11 | — | — | — | — | — | — |
|  | PUD12 | — | — | — | — | — | — |
| Porous layer forming auxiliary agent B | 20% $(NH_4)_2SO_4$aq | — | — | — | — | — | — |
|  | 20% $MgCl_2$aq | 15 | 15 | 15 | 15 | 15 | 15 |
| Silicone additive | SH-193 | 1.0 | 1.0 | 1.0 | 1.0 | 1.0 | 1.0 |
| Water-soluble resin | 15% PVAaq | 30 | 30 | 30 | 30 | 30 | 30 |
| Viscosity improver | D-890T | 1.0 | 1.0 | 1.0 | 1.0 | 1.0 | 1.0 |
| Porous layer forming auxiliary agent for impregnating base fabric |  | 20% $MgCl_2$ | 20% $MgCl_2$ | 20% $MgCl_2$ | 20% $MgCl_2$ | 20% $MgCl_2$ | 20% $MgCl_2$ |
| Surface crack |  | A | A | A | A | A | A |
| Urethane porous layer density [g/cm³] |  | 0.64 | 0.71 | 0.79 | 0.55 | 0.62 | 0.76 |
| Urethane porous layer thickness [mm] |  | 0.41 | 0.42 | 0.36 | 0.38 | 0.39 | 0.39 |
| Peel strength [kgf/inch] |  | 0.86 | 0.89 | 0.79 | 0.75 | 0.85 | 0.94 |
| Moisture permeability A [g/m² · 24 h] |  | 3200 | 3300 | 4300 | 3800 | 3200 | 3200 |
| Moisture permeability loss rate |  | 40.2% | 38.3% | 19.6% | 29.0% | 40.2% | 40.2% |

|  |  | Ex. 19 | Ex. 20 | Ex. 21 | Ex. 22 | Ex. 23 | Ex. 24 |
|---|---|---|---|---|---|---|---|
| Polyurethane aqueous dispersion | PUD1 | — | — | — | — | — | — |
|  | PUD2 | — | — | — | — | — | — |
|  | PUD3 | — | — | — | — | — | — |
|  | PUD4 | — | — | — | — | — | — |
|  | PUD5 | — | — | — | — | — | — |
|  | PUD6 | — | — | — | — | — | — |
|  | PUD7 | 100 | — | — | — | — | — |
|  | PUD8 | — | 100 | — | — | — | — |
|  | PUD9 | — | — | 100 | — | — | — |
|  | PUD10 | — | — | — | 100 | — | — |
|  | PUD11 | — | — | — | — | 100 | — |
|  | PUD12 | — | — | — | — | — | 100 |
| Porous layer forming auxiliary agent B | 20% $(NH_4)_2SO_4$aq | — | — | — | — | — | — |
|  | 20% $MgCl_2$aq | 15 | 15 | 15 | 15 | 15 | 15 |
| Silicone additive | SH-193 | 1.0 | 1.0 | 1.0 | 1.0 | 1.0 | 1.0 |

TABLE 3-continued

|  |  |  |  |  |  |  |  |
|---|---|---|---|---|---|---|---|
| Water-soluble resin | 15% PVAaq | 30 | 30 | 30 | 30 | 30 | 30 |
| Viscosity improver | D-890T | 1.0 | 1.0 | 1.0 | 1.0 | 1.0 | 1.0 |
| Porous layer forming auxiliary agent for impregnating base fabric |  | 20% $MgCl_2$ | 20% $MgCl_2$ | 20% $MgCl_2$ | 20% $MgCl_2$ | 20% $MgCl_2$ | 20% $MgCl_2$ |
| Surface crack |  | A | A | A | A | A | A |
| Urethane porous layer density [g/cm$^3$] |  | 0.49 | 0.65 | 0.58 | 0.57 | 0.76 | 0.74 |
| Urethane porous layer thickness [mm] |  | 0.43 | 0.39 | 0.45 | 0.44 | 0.38 | 0.42 |
| Peel strength [kgf/inch] |  | 0.79 | 0.72 | 0.86 | 0.9 | 0.74 | 0.71 |
| Moisture permeability A [g/m$^2$ · 24 h] |  | 3600 | 3700 | 3500 | 3400 | 4100 | 3600 |
| Moisture permeability loss rate |  | 32.7% | 30.8% | 34.6% | 36.4% | 23.4% | 32.7% |

TABLE 4

|  |  | Comp. Ex. 1 | Comp. Ex. 2 | Comp. Ex. 3 | Comp. Ex. 4 | Comp. Ex. 5 |
|---|---|---|---|---|---|---|
| Polyurethane aqueous dispersion | Comp. PUD1 | 100 | — | — | — | — |
|  | Comp. PUD2 | — | 100 | — | — | — |
|  | Comp. PUD3 | — | — | 100 | — | — |
|  | Comp. PUD4 | — | — | — | 100 | — |
|  | Comp. PUD5 | — | — | — | — | 100 |
|  | Comp. PUD6 | — | — | — | — | — |
|  | Comp. PUD7 | — | — | — | — | — |
|  | Comp. PUD8 | — | — | — | — | — |
|  | PUD1 | — | — | — | — | — |
| Porous layer forming auxiliary agent B | 20% $(NH_4)_2SO_4$aq | 15 | 15 | 15 | 15 | 15 |
|  | 20% $MgCl_2$aq | — | — | — | — | — |
| Silicone additive | SH-193 | 1.0 | 1.0 | 1.0 | 1.0 | 1.0 |
| Water-soluble resin | 15% PVAaq | 30 | 30 | 30 | 30 | 30 |
| Viscosity improver | D-890T | 1.0 | 1.0 | 1.0 | 1.0 | 1.0 |
| Porous layer forming auxiliary agent for impregnating base fabric |  | 20% $(NH_4)_2SO_4$ | 20% $(NH_4)_2SO_4$ | 20% $(NH_4)_2SO_4$ | 20% $(NH_4)_2SO_4$ | 20% $(NH_4)_2SO_4$ |
| Surface crack |  | C | A | C | A | C |
| Urethane porous layer density [g/cm$^3$] |  | 0.94 | 0.65 | 0.91 | 0.54 | 1.02 |
| Urethane porous layer thickness [mm] |  | 0.36 | 0.44 | 0.43 | 0.38 | 0.44 |
| Peel strength [kgf/inch] |  | UM* | 0.62 | UM | 0.55 | UM |
| Moisture permeability A [g/m$^2$ · 24 h] |  | UM | 1200 | UM | 3300 | UM |
| Moisture permeability loss rate |  | UM | 77.6% | UM | 38.3% | UM |

|  |  | Comp. Ex. 6 | Comp. Ex. 7 | Comp. Ex. 8 | Comp. Ex. 9 | Comp. Ex. 10 |
|---|---|---|---|---|---|---|
| Polyurethane aqueous dispersion | Comp. PUD1 | — | — | — | 100 | — |
|  | Comp. PUD2 | — | — | — | — | 100 |
|  | Comp. PUD3 | — | — | — | — | — |
|  | Comp. PUD4 | — | — | — | — | — |
|  | Comp. PUD5 | — | — | — | — | — |
|  | Comp. PUD6 | 100 | — | — | — | — |
|  | Comp. PUD7 | — | 100 | — | — | — |
|  | Comp. PUD8 | — | — | 100 | — | — |
|  | PUD1 | — | — | — | — | — |
| Porous layer forming auxiliary agent B | 20% $(NH_4)_2SO_4$aq | 15 | 15 | 15 | — | — |
|  | 20% $MgCl_2$aq | — | — | — | 15 | 15 |
| Silicone additive | SH-193 | 1.0 | 1.0 | 1.0 | 1.0 | 1.0 |
| Water-soluble resin | 15% PVAaq | 30 | 30 | 30 | 30 | 30 |
| Viscosity improver | D-890T | 1.0 | 1.0 | 1.0 | 1.0 | 1.0 |
| Porous layer forming auxiliary agent for impregnating base fabric |  | 20% $(NH_4)_2SO_4$ | 20% $(NH_4)_2SO_4$ | 20% $(NH_4)_2SO_4$ | 20% $MgCl_2$ | 20% $MgCl_2$ |

TABLE 4-continued

| | | | | | | |
|---|---|---|---|---|---|---|
| Surface crack | | A | C | C | C | A |
| Urethane porous layer density [g/cm³] | | 0.55 | 1.01 | 0.98 | 0.87 | 0.54 |
| Urethane porous layer thickness [mm] | | 0.39 | 0.41 | 0.37 | 0.39 | 0.35 |
| Peel strength [kgf/inch] | | 0.47 | UM | UM | UM | 0.43 |
| Moisture permeability A [g/m² · 24 h] | | 3500 | UM | UM | UM | 1250 |
| Moisture permeability loss rate | | 34.6% | UM | UM | UM | 76.6% |

| | | Comp. Ex. 11 | Comp. Ex. 12 | Comp. Ex. 13 | Comp. Ex. 14 | Comp. Ex. 15 | Comp. Ex. 16 |
|---|---|---|---|---|---|---|---|
| Polyurethane aqueous dispersion | Comp. PUD1 | — | — | — | — | — | — |
| | Comp. PUD2 | — | — | — | — | — | — |
| | Comp. PUD3 | 100 | — | — | — | — | — |
| | Comp. PUD4 | — | 100 | — | — | — | — |
| | Comp. PUD5 | — | — | 100 | — | — | — |
| | Comp. PUD6 | — | — | — | 100 | — | — |
| | Comp. PUD7 | — | — | — | — | 100 | — |
| | Comp. PUD8 | — | — | — | — | — | 100 |
| | PUD1 | — | — | — | — | — | — |
| Porous layer forming auxiliary agent B | 20% (NH₄)₂SO₄aq | — | — | — | — | — | — |
| | 20% MgCl₂aq | 15 | 15 | 15 | 15 | 15 | 15 |
| Silicone additive | SH-193 | 1.0 | 1.0 | 1.0 | 1.0 | 1.0 | 1.0 |
| Water-soluble resin | 15% PVAaq | 30 | 30 | 30 | 30 | 30 | 30 |
| Viscosity improver | D-890T | 1.0 | 1.0 | 1.0 | 1.0 | 1.0 | 1.0 |
| Porous layer forming auxiliary agent for impregnating base fabric | | 20% MgCl₂ | 20% MgCl₂ | 20% MgCl₂ | 20% MgCl₂ | 20% MgCl₂ | 20% MgCl₂ |
| Surface crack | | C | A | C | A | C | C |
| Urethane porous layer density [g/cm³] | | 1.00 | 0.68 | 0.89 | 0.70 | 0.95 | 0.95 |
| Urethane porous layer thickness [mm] | | 0.42 | 0.4 | 0.37 | 0.41 | 0.41 | 0.44 |
| Peel strength [kgf/inch] | | UM | 0.61 | UM | 0.6 | UM | UM |
| Moisture permeability A [g/m² · 24 h] | | UM | 3500 | UM | 3200 | UM | UM |
| Moisture permeability loss rate | | UM | 34.6% | UM | 40.2% | UM | UM |

| | | Comp. Ex. 17 | Comp. Ex. 18 | Comp. Ex. 19 | Comp. Ex. 20 |
|---|---|---|---|---|---|
| Polyurethane aqueous dispersion | Comp. PUD1 | 100 | 100 | — | — |
| | Comp. PUD2 | — | — | — | — |
| | Comp. PUD3 | — | — | — | — |
| | Comp. PUD4 | — | — | — | — |
| | Comp. PUD5 | — | — | — | — |
| | Comp. PUD6 | — | — | — | — |
| | Comp. PUD7 | — | — | — | — |
| | Comp. PUD8 | — | — | — | — |
| | PUD1 | — | — | 100 | 100 |
| Porous layer forming auxiliary agent B | 20% (NH₄)₂SO₄aq | 15 | — | 15 | — |
| | 20% MgCl₂aq | — | 15 | — | 15 |
| Silicone additive | SH-193 | 1.0 | 1.0 | — | 1.0 |
| Water-soluble resin | 15% PVAaq | 30 | 30 | 30 | — |
| Viscosity improver | D-890T | 1.0 | 1.0 | 1.0 | 1.0 |
| Porous layer forming auxiliary agent for impregnating base fabric | | Water | Water | 20% (NH₄)₂SO₄ | 20% (NH₄)₂SO₄ |
| Surface crack | | A | A | A | C |
| Urethane porous layer density [g/cm³] | | 1.03 | 1.05 | 1.01 | 0.61 |
| Urethane porous layer thickness [mm] | | 0.37 | 0.35 | 0.45 | 0.38 |
| Peel strength [kgf/inch] | | 0.21 | 0.3 | 0.81 | UM |
| Moisture permeability A [g/m² · 24 h] | | UM | UM | 900 | UM |
| Moisture permeability loss rate | | UM | UM | 83.2% | UM |

UM: unmeasurable

All of the examples had good crack resistance and peel strength. The reason why the measurement is not possible in the comparative example is that the normal value measurement is not possible due to the occurrence of the surface crack (Comparative Examples 1, 3, 5, 7, 8, 9, 11, 13, 15, 16, and 20) or the normal value measurement is not possible due to water intrusion between the base material and the porous layer (Comparative Examples 17 and 18).

REFERENCE SIGNS LIST

10: Base material
10A: Water-containing base material
10B: Coating film structure
10C: Porous structure
12A to 12H: Roll
14: Water-containing treatment tank
14A: Base material treatment aqueous solution
16: Foaming composition
17: Squeegee
18: Foaming tank
19: Drying apparatus
20, 22: Washing tank
20A: Washing water

The invention claimed is:

1. A porous layer structure, comprising:
a base material; and
a polyurethane porous layer formed on the base material, the polyurethane porous layer being formed by a polyurethane resin aqueous dispersion, the polyurethane porous layer having a continuous air bubble wherein air bubbles generated by foaming in the polyurethane porous layer on the base material are partially united with each other to share holes, the holes having diameters smaller than a diameter of the air bubbles, thereby forming the continuous air bubble,
wherein a moisture permeability A of the porous layer structure measured by JIS L1099 A-1 is 2,000 to 10,000 g/(m²·24 h),
a moisture permeability loss rate is 75% or less, the moisture permeability loss rate being obtained by formula:

moisture permeability loss rate (%)=(1−(moisture permeability $A$/moisture permeability $B$))×100, wherein the moisture permeability B is a moisture permeability of the base material alone measured by JIS L1099A-1,
wherein a peel strength at a bonding surface between the base material and the polyurethane porous layer is 0.7 kgf/inch or more, and
wherein the polyurethane porous layer comprises a polyurethane containing a polyol component, an isocyanate component, and a hydrophilic alkylene oxide component having one or more active hydrogen groups and having an alkylene oxide.

2. The porous layer structure according to claim 1, wherein the polyurethane porous layer has a thickness of 0.1 to 1.0 mm and the polyurethane porous layer has a density of 0.10 to 0.90 g/cm³.

3. The porous layer structure according to claim 1, wherein a content of the hydrophilic alkylene oxide component with respect to the polyurethane is 1 to 25% by mass.

4. The porous layer structure according to claim 1, wherein the base material comprises water.

5. The porous layer structure according to claim 4, wherein a water content in the base material is 200 to 400% by mass with respect to 100% by mass base material without water.

6. The porous layer structure according to claim 4, wherein the base material further comprises a porous layer forming auxiliary agent.

7. A porous layer structure, comprising:
a base material comprising water; and
a polyurethane porous layer formed on the base material, the polyurethane porous layer being formed by a polyurethane resin aqueous dispersion,
wherein a moisture permeability A of the porous layer structure measured by JIS L1099 A-1 is 2,000 to 10,000 g/(m²·24 h),
a moisture permeability loss rate is 75% or less, the moisture permeability loss rate being obtained by formula:

moisture permeability loss rate (%)=(1−(moisture permeability $A$/moisture permeability $B$))×100, wherein the moisture permeability B is a moisture permeability of the base material alone measured by JIS L1099A-1,
wherein a peel strength at a bonding surface between the base material and the polyurethane porous layer is 0.7 kgf/inch or more,
wherein the polyurethane porous layer comprises a polyurethane containing a polyol component, an isocyanate component, and a hydrophilic alkylene oxide component having one or more active hydrogen groups and having an alkylene oxide, and
wherein a water content in the base material is 200 to 400% by mass with respect to 100% by mass base material without water.

8. The porous layer structure according to claim 7, wherein the base material further comprises a porous layer forming auxiliary agent.

9. A method for producing the porous layer structure according to claim 1, the method comprising:
(1) producing a water-containing base material by coating the base material with a base material treatment aqueous solution comprising a porous layer forming auxiliary agent A, the porous layer forming auxiliary agent A comprising a salt;
(2) forming a coating film structure by coating the water-containing base material with a foaming composition obtained by subjecting a blended liquid comprising a porous layer forming auxiliary agent B comprising a salt, a foam stabilizer, a water-soluble resin, and a polyurethane resin aqueous dispersion to foaming treatment;
(3) drying the coating film structure;
(4) washing the coating film structure after the drying; and
(5) drying the coating film structure after the washing,
wherein polyurethane resin particles in the polyurethane resin aqueous dispersion comprise a polyol component, an isocyanate component, and a hydrophilic alkylene oxide component having one or more active hydrogen groups and having an alkylene oxide, and
the polyurethane resin particles comprise the hydrophilic alkylene oxide component in an amount of from 1 to 25% by mass.

10. The method according to claim 9, wherein an organic solvent is not used in the producing, the forming, and the washing.

11. The method according to claim 10, wherein the foaming treatment is mechanical foaming.

\* \* \* \* \*